Patented Apr. 30, 1940

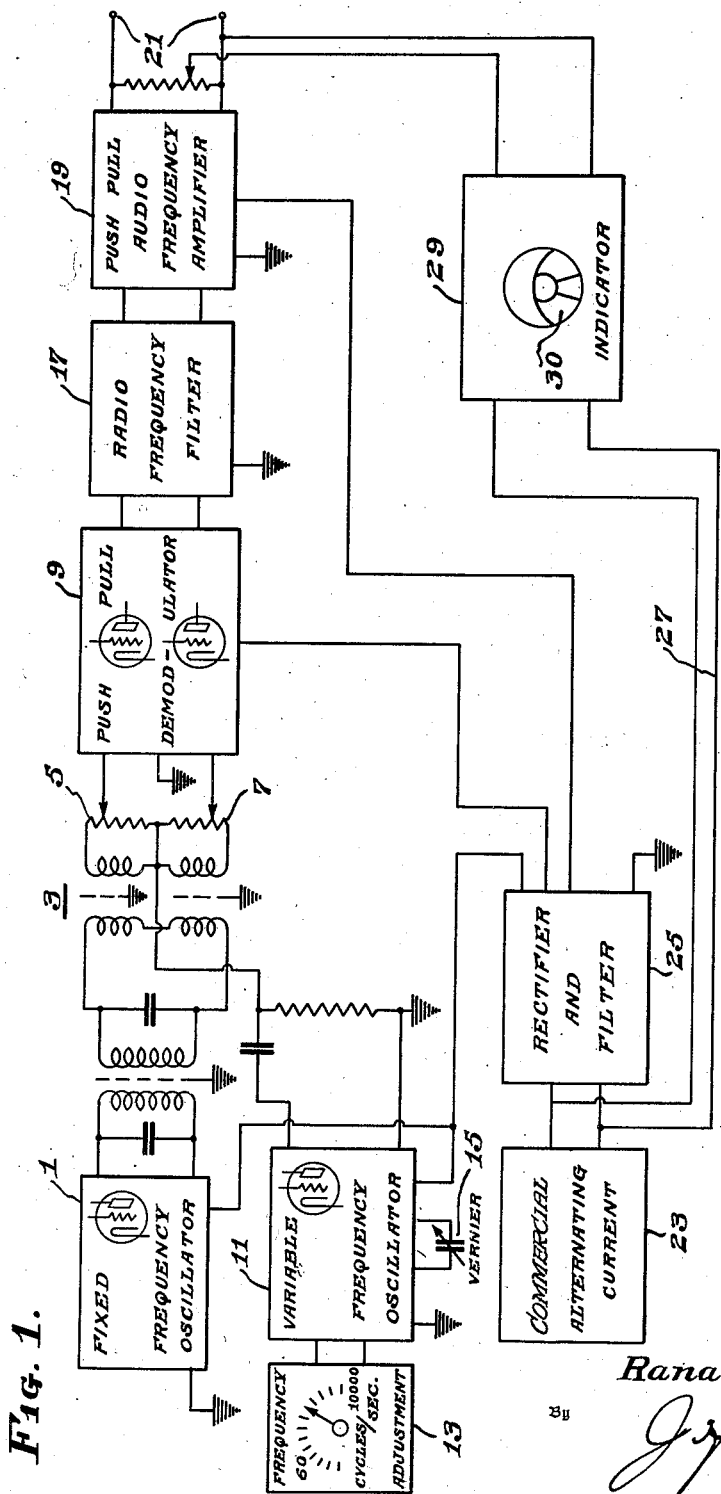

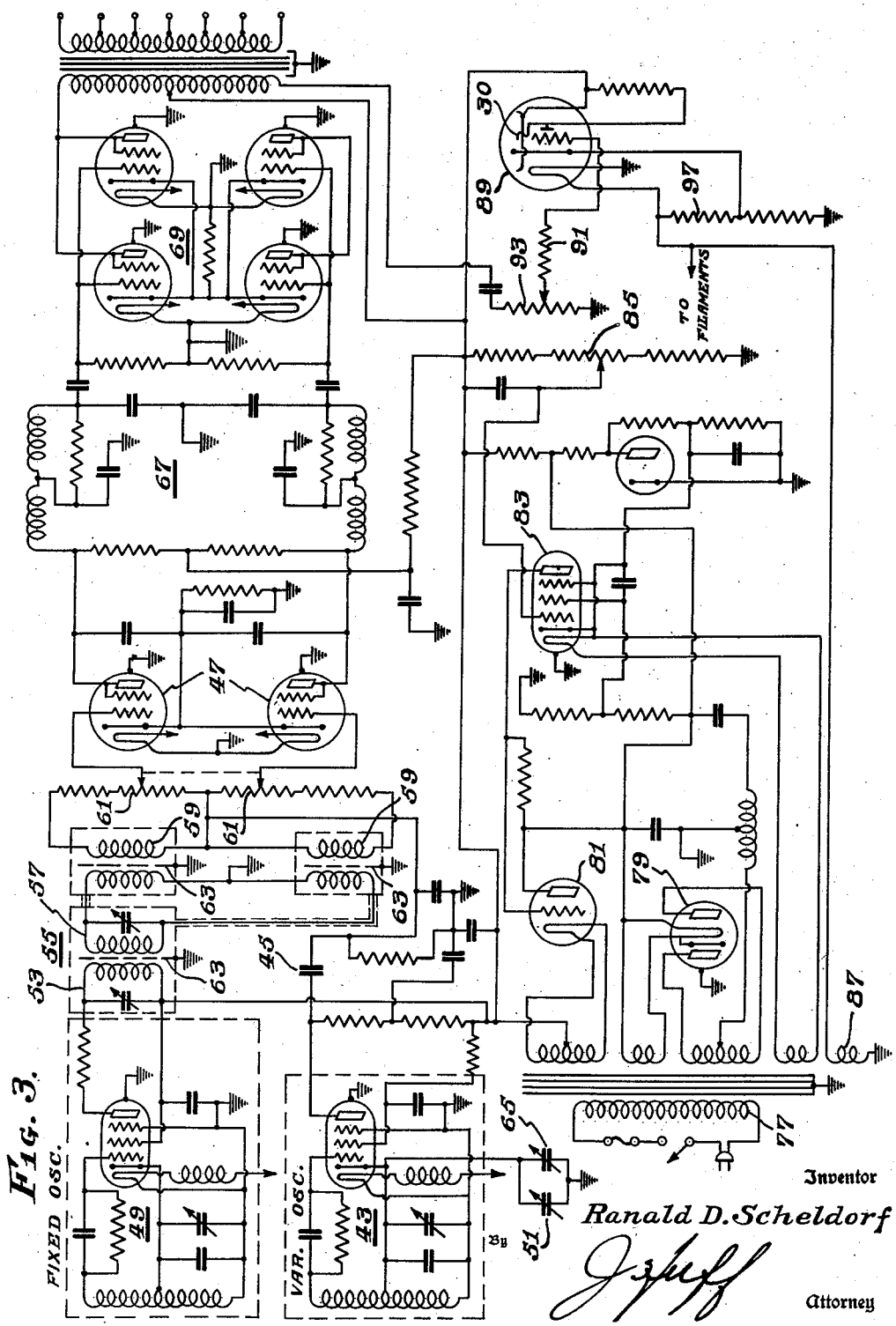

2,199,189

UNITED STATES PATENT OFFICE 2,199,189

BEAT FREQUENCY INDICATOR

Ranald D. Scheldorf, Haddon Heights, N. J., assignor to Radio Corporation of America, a corporation of Delaware Application March 31, 1937, Serial No. 134,097

4 Claims. (Cl. 177—311)

My invention relates to frequency indicators. Specifically, my invention provides means for indicating the frequency relation of two alternating currents, one of which, for example, may have a fixed known frequency and the other may have a variable frequency.

By way of illustration, a particular application will be described for which my invention is particularly suitable, but it is evident that there are other devices which may well incorporate the frequency indicator according to my invention.

Audio frequency currents which are adjustable throughout a range of frequencies are often produced by combining currents from two oscillators. One of the oscillators is fixed in frequency, while the other oscillator is adjusted throughout a range of frequencies to obtain the desired beat frequency oscillations. Such a device is commonly known as a "beat frequency oscillator." It is customary to use a frequency adjusting element which is calibrated in cycles per second or in other conventional units. In order to have the calibration of this element coincide with the actual beat frequency, a vernier adjustment is provided. By means of the vernier the operator of the device adjusts the audio output frequency until an indication is obtained that the output frequency is equal to a known reference frequency.

Several different arrangements have been proposed to determine the position at which the vernier adjustment should be placed to have the calibrated scale suitably match the audio output frequencies. One such means is to use a tuning fork to compare the tuning fork frequency with the audio frequency output. Another means is to provide a galvanometer as the indicating source. The galvanometer is actuated by a standard audio frequency current and a portion of the generated audio frequency output to indicate beat frequencies.

My invention provides a very simple means of indicating the actual frequency of the output. Inasmuch as the commercial power source for the oscillators, demodulator and audio frequency amplifier is usually a current of 60 cycles per second, I propose to provide means for comparing the 60-cycle per second supply current with the unknown audio frequency generated by the beat frequency oscillator. The means which I propose to employ has a number of advantages such as simplicity, low cost, permanence, absence of moving parts, continuous indication, high sensitivity, low operating power, and ability to correctly indicate harmonic relationships which tend to give false indications in some of the indicators which have been previously employed.

One of the objects of my invention is to provide means for indicating the frequency of variable frequency current as compared with a substantially fixed frequency current.

Another object of my invention is to provide means for indicating the relative frequency of a 60-cycles per second supply current as compared with a locally generated audio frequency current.

A further object of my invention is to provide a frequency indicating means which is inertialess, inexpensive and simple to operate.

Referring to the accompanying drawings,

Figure 1 is a schematic illustration of one embodiment of my invention as applied to a "beat frequency oscillator,"

Figures 2a, 2b, 2c, 2d and 2e are illustrations of patterns of the indicator of Fig. 1, and Figure 3 is a schematic circuit diagram showing one method of applying my invention.

In Fig. 1 the output circuit of a fixed frequency oscillator 1 is connected to a resonant transformer system 3. The transformer's 3 terminate in a pair of attenuators 5, 7. The adjustable elements of the attenuators 5, 7 are connected to the input circuit of a push-pull demodulator 9. An adjustable frequency oscillator 11, which includes a frequency adjusting means 13 and a vernier adjustment 15, is connected to the input circuit of the demodulator 9 so that the output from the variable frequency oscillator 11 is impressed upon the demodulator circuits in parallel. The output of the demodulator 9 includes currents whose frequency is equal to the difference frequency and the sum frequency of the fixed and variable frequency oscillators and the frequency of the fixed frequency oscillator. Of these several components the audio frequency current, which is equal to the difference frequency, is passed and the radio frequency currents attenuated by a suitable filter 17. The audio frequency currents are impressed upon the input circuit of a push-pull amplifier 19. The output circuit from the audio frequency amplifier is represented by a pair of terminals 21.

The power supply for the foregoing apparatus is derived from a source 23 of alternating current. The alternating current is rectified and filtered by a suitable means 25 and impressed upon the anode circuits of the thermionic tube included in the oscillators, demodulator and audio frequency amplifier. A portion of the 60-cycles per second current is connected by leads 27 and impressed upon the beat frequency indicator 29 which preferably includes an amplifier. A portion of the audio frequency output current is likewise impressed on the beat frequency indicator 29.

One suitable indicator is manufactured under the trade-mark name "Magic Eye." This device includes an amplifier tube and a willemite screen 30 upon which the effect of applied potential indications may be observed in terms of a fluorescent area. If the audio frequency output current is of exactly the same frequency as the 60-cycles per second supply current, and of the opposite phase, and if these two currents are at substantially the same potential, the indication will be a steady angular opening, or sector, 32 which is less luminescent than the fixed area 34 as illustrated in Fig. 2b. The degree or angle of the opening is determined by the relative phases of the currents. In any event, if the phase is not shifting, the illuminated sector will be steady, although it may be included within a very small angle as determined by the tube construction, the maximum angle, or any intermediate angle. If, however, the two frequencies are not exactly the same, but substantially so, the opening of Fig. 2b will be characterized by a varying increase and decrease in the angle bounding the opening; that is, the area of the luminescent sector will increase and decrease at a rate which corresponds to the frequency difference between the currents of the 60-cycles per second supply and the audio frequency output across the terminals 21.

If the comparison happens to be between a fundamental and a second harmonic frequency; e. g., 120-cycles per second currents and 60-cycles per second currents, angular traces of three degrees of luminescence will appear, as represented in Fig. 2c. One of these traces, 31, will have a faint luminescent appearance, while the smaller pairs of traces 33, 35 will be increasingly more luminescent. The one trace 32 indicates the absence of varying currents, while the pairs of superimposed traces 33, 35 indicate the presence of second harmonic or 120-cycles per second currents.

If the 60-cycles per second supply current is compared with a 30-cycles per second audio frequency current, the luminescent sector on the fluorescent screen of the indicator will appear as indicated in Fig. 2a. This figure corresponds with Fig. 2c, except that the lighter trace or sector is now numbered 37 and as before corresponds to the absence of alternating currents, while the two darker or superimposed pairs of traces 39, 41 indicate the second harmonic relationship, corresponding, respectively, to areas 33, 35.

If the 60-cycles per second alternating current from the source is compared to an audio frequency output of 180 cycles, seven angular traces appear as shown in Fig. 2d. Of these, three on either side of the central trace are of the superimposed type. In a similar manner, if the supply current is compared with 240-cycles per second audio frequency output currents, nine traces appear as shown in Fig. 2e. If in the comparison any of the several currents, represented by the illustrations of Figs. 2a, 2c, 2d and 2e, one of the currents happens to vary slightly in frequency from its exact harmonic or sub-harmonic relation to the other, the area covered by the several superimposed traces will vary cyclically at a corresponding frequency. While I have illustrated a few of the patterns which may be obtained and readily recognized, other more complicated patterns are obtained whenever the two currents bear a definite predetermined fractional or multiple relation to one another. In each instance the relative area covered by the several traces will vary with the phase relation of the two currents. When this variation takes place the traces appear to rotate. The pattern for each particular ratio is different, and the less complex patterns are easily recognizable. Thus, the indication enables the user to determine the frequency of the audio output currents as compared with the 60-cycles per second supply current.

In general, the indication which is most useful is represented by Fig. 2b. To obtain this indication for the purpose of calibrating the beat frequency oscillator, the frequency adjustable element 13 is placed adjacent a scale indication of 60 cycles per second. The vernier 15 is slowly adjusted until the pattern of Fig. 2b is indicated. As this condition is approached, the indicator will show an angular opening in the fixed luminous area which at first varies rapidly and gradually slowly changes until finally the area will remain stationary over a long period of time. This will indicate that the audio output current is set at 60 cycles per second. Then the 60-cycles per second audio output current is coacting with the 60-cycles per second supply current in the indicator to form a so-called zero beat indication, and the scale calibration of 13 is therefore correct. If the user has by chance adjusted the vernier to obtain beats between the 60-cycles per second supply current and currents of 30, 120, 180 or 240 cycles per second, the more complex patterns shown in Figs. 2a, 2c, 2d and 2e, respectively, will appear. Higher ratio patterns are more difficult to distinguish, and are therefore not commonly used.

Inasmuch as the initial 60-cycles per second audio output may be obtained when the variable frequency oscillator of the beat frequency oscillator differs by 60 cycles per second more than or less than the frequency of the fixed oscillator, it is possible to adjust the vernier so that the same indication is obtained under either condition. I prefer to avoid this possibility by making the adjustment of the vernier 15 in the direction corresponding to reducing the highest frequency to the lowest frequency within the range of the vernier, when the main frequency adjustment has been set upon the calibration of 60 cycles per second. In any event, if this error does occur, it may be readily checked by observing the beat frequency indications at 120, 180, etc., cycles per second. The ability to check the higher frequency points in this manner is one of the outstanding advantages of my invention.

Although numerous circuit arrangements may be employed with the beat frequency indicator of my invention, I prefer to use a circuit similar to the circuit illustrated in Fig. 3. In this circuit, the variable frequency oscillator 43 is arranged with a resonant plate circuit which is suitably coupled to the grid circuit to obtain high frequency current oscillations which are impressed through a coupling capacitor 45 on the grid electrodes of a pair of push-pull demodulators 47. The fixed frequency oscillator 49 is also a tuned plate oscillator in which the plate circuit is suitably coupled to the grid circuit to generate oscillatory currents. The variable tuning element is represented as a variable capacitor 51. The output currents of the oscillator 49 are impressed on the primary 53 of the resonant transformer 55.

The secondary circuit 57 of the transformer 55 is coupled through a link circuit to a pair of secondary coils 59. The secondary coils 59 are shunted by attenuators 61. The adjustable contacts of attenuators 61 are connected respectively to the grid electrodes of the demodulators 47. It will be observed that the transformers have windings which may be electrostatically shielded by shields 63. It will also be noted that the oscillators are electronically coupled to their output circuits. This type of coupling reduces the interaction of the oscillators on each other as the frequency of the two oscillators becomes nearly equal and prevents the oscillators from "locking in." The adjustable vernier 65 is used to align the variable frequency oscillator in relation to the fixed frequency oscillator so that the calibration on the scale agrees with the audio frequency output.

The output circuits of the push-pull demodulator 47 are connected to a filter network 67 which may be of any type suitable for attenuating the undesired radio frequency currents and passing the audio frequency currents generated by the interaction of currents of the different frequency of the two oscillators. The audio frequency currents which appear in the output circuit of the filter 67 are impressed upon a push-pull audio frequency amplifier 69. While the amplifier is illustrated as employing four tubes, it should be understood that any suitable audio amplifier may be used. The output of the amplifier 69 is impressed through a transformer 71 on a work or load circuit which is not shown but which is represented by a series of taps on the secondary 73 of the transformer 71.

The power supply is obtained from a commercial source of alternating current which is not shown. The plug 75 is connected to the alternating current source and to transformer primary 77. The secondaries of the power transformer are connected to a full-wave rectifier 79 and regulator tubes 81, 83. The purpose of the regulator tubes is to maintain a constant voltage across the potentiometer network 85. Although there are numerous circuits for obtaining a constant direction current from a rectified filter alternating current, I prefer to use the system which has been described and claimed in the copending application of Arthur W. Vance entitled "Regulating devices," Serial No. 696,001, which was filed October 31, 1932, and assigned to the same assignee as the present application. It should be understood that any suitable current source may be used for the anode circuits of the several tubes employed in the beat frequency oscillator.

A secondary 87 is used to energize the heater circuits of several tubes. A connection from this secondary is made to the heater circuit of the beat frequency indicator tube 89. This tube is preferably of the type commercially known as the "6E5" which is sold under the trade-mark name "Magic Eye." The grid circuit of the indicator 89 is connected through a resistor 91 to a potentiometer 93. The potentiometer 93 is connected through a capacitor 95 to the audio frequency output transformer 71. The cathode of the indicator 89 is connected to a suitable point on potentiometer 97 which is shunted across the heater circuit of the indicator. The purpose of this connection is to obtain a voltage from the 60-cycles per second supply current which is substantially equal and opposite to the current supplied from the output transformer 71. The anode current supply may be obtained by connection to the potentiometer 85. The fluorescent screen is represented by reference numeral 30. The operation of the beat frequency indicator has been previously described and the patterns obtained are shown in Figs. 2a to 2e, inclusive.

Thus, I have described a frequency indicator used in conjunction with a beat frequency oscillator in which the currents from two oscillators are impressed upon a push-pull demodulator. The output of the demodulator includes radio frequency and audio frequency components. The audio frequency is separated from the radio frequency currents by a filter. The output of the filter, which includes the desired audio frequency current only, is impressed upon an audio frequency amplifier. The several thermionic tubes used in a beat frequency oscillator have heaters which are energized by alternating currents of known frequency. This current of known frequency, together with the audio output current of the beat frequency oscillators, is impressed on the frequency indicator to thereby enable the user to adjust the oscillators to a previously calibrated scale. The several patterns produced by harmonic frequency currents have been described. It should be understood that the beat frequency indicator is not limited to any particular form of area trace. For example, the trace may be the area bounded by circles of fixed or varying radii or a portion of such area.

I claim as my invention:

1. A frequency comparator for indicating the frequency of an unknown alternating voltage with respect to a known alternating voltage, the frequencies of which are related in ratios of small whole numbers, comprising an indicator having a fluorescent screen, a control electrode means for producing indications of distinguishably different luminescence on said screen, the potential of said control electrode means determining the distinguishable indications, and means for varying the instantaneous potential of said control electrode means as a function of the sum of said known and unknown voltages.

2. A frequency comparator for indicating the frequency of an unknown with respect to a known alternating voltage, the frequencies of which are related in ratios of small whole numbers, comprising an indicator having a fluorescent screen, a control electrode radially disposed with respect to said screen for producing sectors of distinguishably different luminescence on said screen, the potential of said control electrode determining the relative areas of said sectors, and means for varying the instantaneous potential of said control electrode as a function of the sum of said known and unknown voltages.

3. A frequency comparator for indicating the frequency of an unknown alternating voltage with respect to a known alternating voltage, the frequencies of which are related in ratios of small whole numbers, comprising an indicator having a fluorescent screen, a control electrode radially disposed with respect to said screen, and means for varying the potential of said control electrode as a function of the sum of said known and unknown voltages to produce sectors of distinguishably different luminescence on said screen, the number and relative luminescence of said sectors being a measure of said frequency ratio.

4. A frequency comparator for indicating the relative frequencies of two voltages the frequencies of which are related to each other in ratios of small whole numbers, comprising an indicator having a control electrode and a fluorescent screen, means for producing sectors having different degrees of luminescence on said screen, means responsive to the instantaneous potential of said control electrode for varying the relative areas of luminescence of said sectors, and means for varying the instantaneous potential of said electrode as a function of the vector sum of said two voltages whereby said screen is divided into luminescent sectors, the number of said sectors being dependent on said frequency ratio.

RANALD D. SCHELDORF.